(12) United States Patent
Kosaka et al.

(10) Patent No.: US 6,232,700 B1
(45) Date of Patent: May 15, 2001

(54) ELECTROMECHANICAL ACTUATOR THAT COMPENSATES FOR AN APPLIED LOAD AND APPARATUS EMPLOYING THE SAME

(75) Inventors: Akira Kosaka, Yao; Tetsuro Kanbara, Sakai, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/121,806

(22) Filed: Jul. 23, 1998

(30) Foreign Application Priority Data

Jul. 25, 1997 (JP) .................................................... 9-213943

(51) Int. Cl.$^7$ ................................. H02N 2/06; H02N 2/04
(52) U.S. Cl. ....................................... 310/323.17; 310/317
(58) Field of Search .................... 310/323.17, 323.01, 310/323.02, 328, 317

(56) References Cited

U.S. PATENT DOCUMENTS

| | | | | |
|---|---|---|---|---|
| 4,801,837 | * | 1/1989 | Adams ................................. | 310/316 |
| 4,894,579 | * | 1/1990 | Higuchi et al. ...................... | 310/328 |
| 5,225,941 | | 7/1993 | Salto et al. .......................... | 359/824 |
| 5,237,238 | * | 8/1993 | Berghaus et al. .................... | 310/328 |
| 5,418,418 | * | 5/1995 | Hirano et al. ........................ | 310/328 |
| 5,479,064 | * | 12/1995 | Sano ..................................... | 310/328 |
| 5,523,643 | * | 6/1996 | Fujimura et al. .................... | 310/328 |
| 5,563,465 | * | 10/1996 | Nakahara et al. ................... | 310/328 |
| 5,587,846 | * | 12/1996 | Miyano et al. ...................... | 359/824 |
| 5,589,723 | | 12/1996 | Yoshida et al. ...................... | 310/328 |
| 5,869,918 | * | 2/1999 | Ashizawa ............................. | 310/328 |
| 5,900,691 | * | 5/1999 | Reuter et al. ........................ | 310/348 |
| 5,917,267 | * | 6/1999 | Miayzawa et al. .................. | 310/317 |

FOREIGN PATENT DOCUMENTS 10-39359   2/1998   (JP) .

* cited by examiner

Primary Examiner—Thomas M. Dougherty
(74) Attorney, Agent, or Firm—Sidley & Austin

(57) ABSTRACT

An actuator using an electromechanical transducer suitable for an apparatus where the magnitude of the load differs depending on drive directions. An apparatus using the actuator in which the actuator is arranged such that a direction of a further advantageous and further efficient displacement characteristic in elongation displacement characteristic and contraction displacement characteristic of the electromechanical transducer, is made to coincide with a drive direction where the load is larger. In the case of a mechanism of a camera for driving a correcting lens, an X-axis actuator and a Y-axis actuator are arranged at a base frame. The correcting lens is driven in the X-axis direction and the Y-axis direction. The Y-axis actuator is arranged such that a direction of a further advantageous displacement characteristic of an electromechanical transducer of the Y-axis actuator is made to coincide with a positive direction of the Y-axis where the load is larger in order to drive the correcting lens in the positive direction of the Y-axis against gravitational force.

22 Claims, 12 Drawing Sheets

PRIOR ART

ELECTROMECHANICAL ACTUATOR THAT COMPENSATES FOR AN APPLIED LOAD AND APPARATUS EMPLOYING THE SAME

BACKGROUND OF THE INVENTION

1. Field of the Invention

The present invention relates to an actuator using an electromechanical transducer, particularly to an actuator using an electromechanical transducer suitable for finely positioning an optical system of a lens or the like.

The present invention also relates to an apparatus such as an optical system which employs such actuator.

2. Prior Art

There have been proposed actuators using an electromechanical transducer having a piezoelectric element for driving component parts in a camera and other precision equipment. Such actuators are disclosed in U.S. Pat. No. 5,589,723 and Japanese Laid Open Patent Publication No. 10-39359.

Here, an explanation will be given of a basic construction of such an actuator. FIG. 12 is a perspective view showing an actuator by disassembling it into constituent members, FIG. 13 is a perspective view showing a state where the actuator is assembled and FIG. 14 is a sectional view showing the structure of a portion where a drive shaft, a slider block and a pad are frictionally coupled. An actuator 100 is constituted by a frame 111, support blocks 113, 113a and 114, a drive shaft 116, a piezoelectric element 115, a slider block 112, and a pad 118. The drive shaft 116 is supported by the support block 113a and the support block 114 movably in the axial direction. One end of the piezoelectric element 115 is fixedly adhered to the support block 113 and other end thereof is fixedly adhered to one end of the drive shaft 116. The drive shaft 116 is supported such that it can be displaced in the axial direction (arrow mark "a" direction and direction opposed thereto) when a displacement is caused in the thickness direction of the piezoelectric element 115.

The drive shaft 116 penetrates the slider block 112 in the horizontal direction, an opening portion 112a is formed at an upper portion of the slider block 112 which the drive shaft 116 penetrates and an upper half of the drive shaft 116 is exposed. Further, a pad 118 which is brought into contact with the upper half of the drive shaft is fittedly inserted into the opening portion 112a, a projection 118a is installed at an upper portion of the pad 118, the projection 118a of the pad 118 is pushed down by a leaf spring 119 and downward urging force F for bringing the pad 118 in contact with the drive shaft 116 is applied on the pad 118. Incidentally, numeral 121 designates screws for fixing the leaf spring 119 to the slider block 112. The structure of the portion where the drive shaft 116, the slider block 112 and the pad 118 are brought into contact with each other is shown by FIG. 14.

By such a structure, the drive shaft 116, the pad 118 and the slider block 112 are frictionally coupled by pertinent frictional coupling force. Adjustment of the urging force F for determining the frictional coupling force can be controlled by a degree of fastening the screws 121.

Next, an explanation will be given of the operation. First, when a sawtooth wave drive pulse having a gradual rise portion and a steep fall portion as shown by FIG. 15(a) is applied to the piezoelectric element 115, at the gradual rise portion of the drive pulse, the piezoelectric element 115 is gradually displaced to elongate in the thickness direction and the drive shaft 116 coupled to the piezoelectric element 115 is also displaced gradually in the positive direction (arrow mark "a" direction). At this moment, the slider block 112 frictionally coupled to the drive shaft 116 is moved in the positive direction along with the drive shaft 116 by the frictional coupling force and accordingly, a driven member not illustrated which is coupled to the slider block, for example, a frame for holding a correcting lens in the case of a correcting lens drive mechanism can be moved.

At the steep fall portion of the drive pulse, the piezoelectric element 115 is rapidly displaced to contract in the thickness direction and the drive shaft 116 coupled to the piezoelectric element 115 is also displaced rapidly in the negative direction (direction opposed to arrow mark "a"). At this moment, the slider block 112 frictionally coupled to the drive shaft 116 remains unmoved substantially at the position by overcoming the frictional coupling force by inertia force. By continuously applying the drive pulses to the piezoelectric element 115, reciprocating oscillation having different speeds is caused in the drive shaft 116 and the slider block 112 frictionally coupled to the drive shaft 116 can be moved continuously in the positive direction.

Incidentally, "substantially" mentioned here includes a case where the slider block 112 follows the drive shaft 116 while causing a slip on faces where the slider block 112 and the drive shaft 116 are frictionally coupled in either of the positive direction and the direction opposed thereto and the slider block 112 is moved as a whole in the arrow mark "a" direction by a difference in drive time periods.

In moving the slider block 112 in a direction opposed to the previous direction (direction opposed to arrow mark "a"), the movement can be achieved by changing the waveform of the sawtooth wave drive pulse applied on the piezoelectric element 115 and applying a drive pulse comprising a steep rise portion and a gradual fall portion as shown by FIG. 15(b).

According to the actuator using a piezoelectric element mentioned above, it has become apparent by experiments that the elongation displacement characteristic and the contraction displacement characteristic of the piezoelectric element in respect of the same applied voltage differ from each other and accordingly, the drive speeds differ from each other between a case where the sawtooth wave drive pulse having the gradual rise portion and the steep fall portion as shown by, for example, FIG. 15(a) and a case where the drive pulse comprising the steep rise portion and the gradual fall portion as shown by FIG. 15(b) having a waveform where the previous drive pulse is reverted.

Therefore, in order to provide the same drive speed in either of the directions of both in the case of moving the slider block in the positive direction (arrow mark "a" direction) by utilizing the gradual elongation displacement of the piezoelectric element (hereinafter, referred to as elongation displacement drive) and in the case of moving the slider block in the negative direction (direction opposed to arrow mark "a") by utilizing the gradual contraction displacement of the piezoelectric element (hereinafter, referred to as contraction displacement drive), the piezoelectric element may be driven by generating drive pulses respectively having different waveforms in accordance with the elongation displacement drive and the contraction displacement drive.

However, generation of the drive pulses respectively having different waveforms in accordance with the elongation displacement drive and the contraction displacement drive gives rise to inconvenience where not only the structure of a drive pulse generating circuit or a control circuit becomes complicated but also number of parts is increased and the manufacturing cost is increased.

Further, depending on an apparatus to which the above-described actuator is applied, the drive speed of the actuator is changed by a direction of the gravitational force exerted on the apparatus. For example, when the above-described actuator is applied in driving a correcting lens for correcting a shift in holding a camera, load applied on the actuator is varied and the speed for driving the correcting lens is changed in either of a case where the correcting lens is moved in the up and down direction, that is, in the direction of the gravitational force when the optical axis of the photographing lens of the camera is substantially at the horizontal position and in the case where it is moved against the gravitational force.

In this way, depending on an apparatus to which the actuator is applied, there causes inconvenience where load is varied by the direction of the gravitational force exerted on the apparatus and the drive speed is changed or the like.

SUMMARY OF THE INVENTION

It is a principal object of the present invention to provide an actuator using a novel electromechanical transducer suitable for an apparatus in which magnitude of load differs depending on a drive direction.

It is another object of the present invention to provide an actuator using an electromechanical transducer in which a drive direction showing further advantageous displacement in the elongation displacement drection and contraction displacement direction of the actuator is substantially made to coincide with a direction of driving a driven member having a larger load.

It is another object of the present invention to provide an actuator using an electromechanical transducer in which a drive direction showing further advantageous displacement in the elongation displacement direction and the and contraction displacement direction of the actuator is substantially made to coincide with a direction of driving a driven member which is requested to drive at a higher speed.

It is another object of the present invention to provide an apparatus using an actuator having the above-described characteristics.

Other objects of the present invention become apparent from a detailed explanation in reference to attached drawings.

DETAILED DESCRIPTION OF THE PREFERRED EMBODIMENTS

Figure 1:
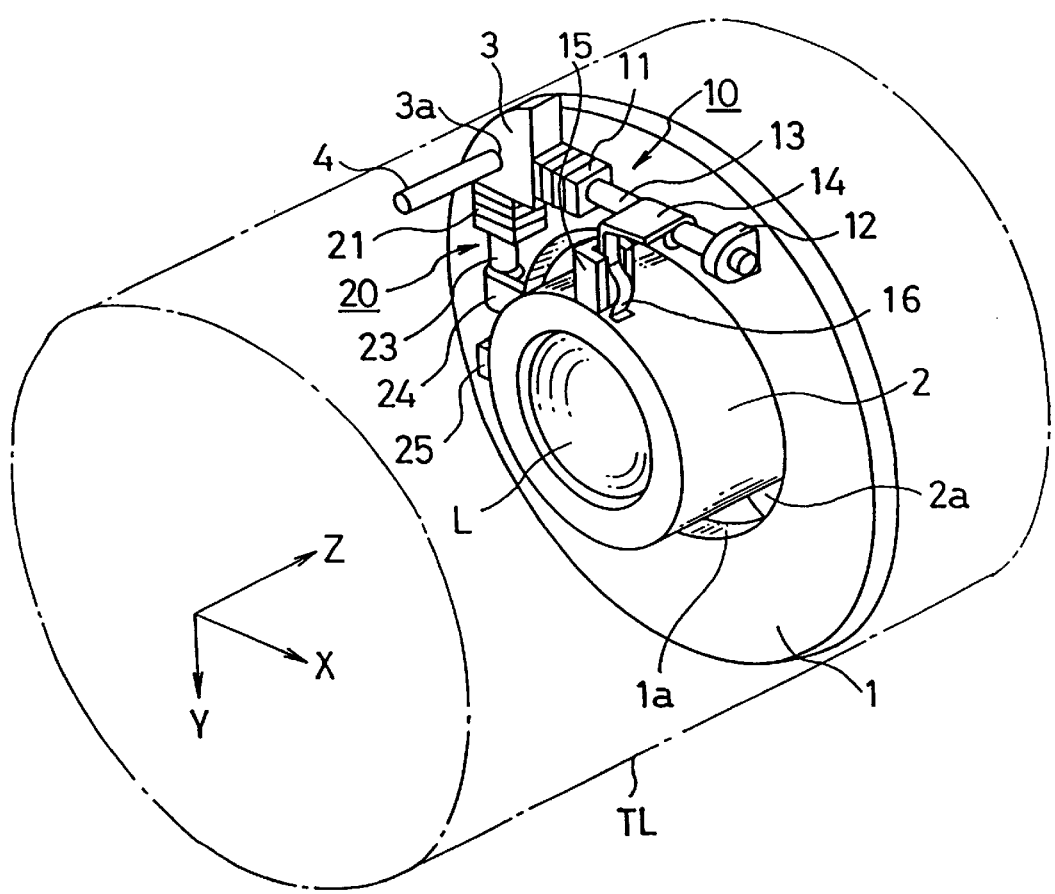
FIG. 1 is a perspective view of an embodiment of the invention showing the structure of an apparatus for correcting a shift in holding a camera.
Figure 2:
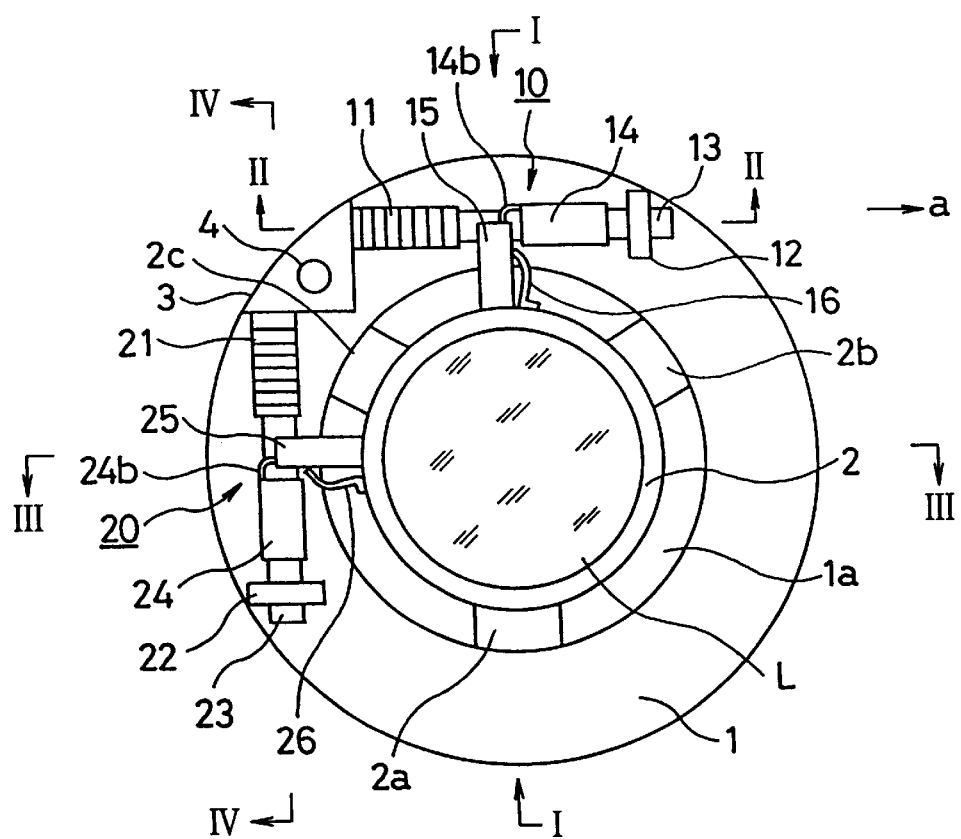
FIG. 2 is a front view of the embodiment shown by FIG. 1.
Figure 3:
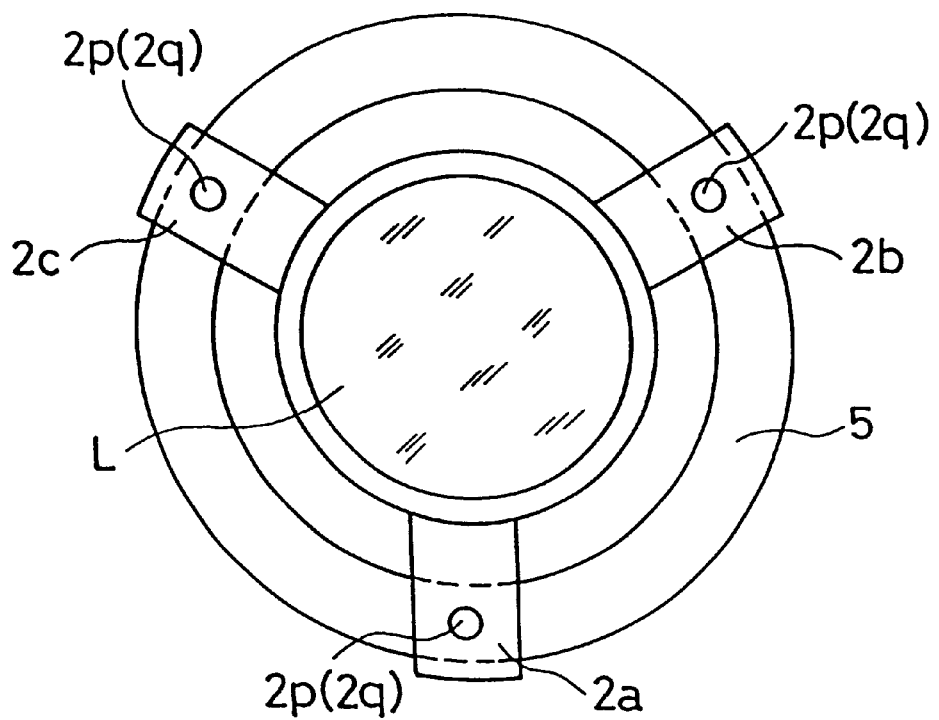
FIG. 3 is a front view showing a barrel of a correcting lens L.
Figure 4A:
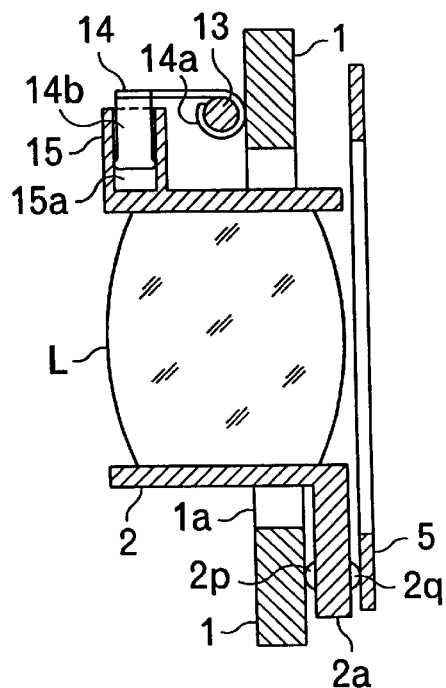
FIG. 4(a) is a sectional view taken along a line I—I of the embodiment shown by FIG. 2.
Figure 4B:
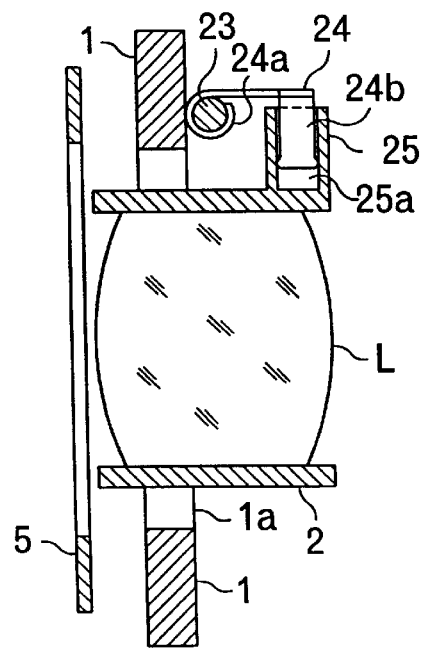
FIG. 4(b) is a sectional view taken along a line III—III of the embodiment shown by FIG. 2.
Figure 5A:
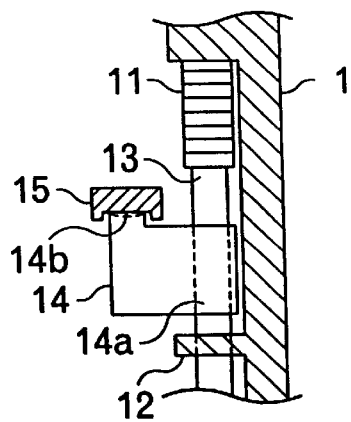
FIG. 5(a) is a sectional view taken along a line II—II of the embodiment shown by FIG. 2.
Figure 5B:
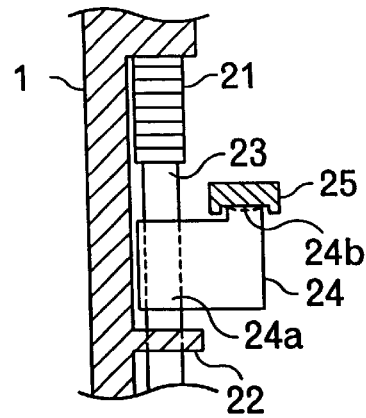
FIG. 5(b) is a sectional view taken along a line IV—IV of the embodiment shown by FIG. 2.
Figure 6:
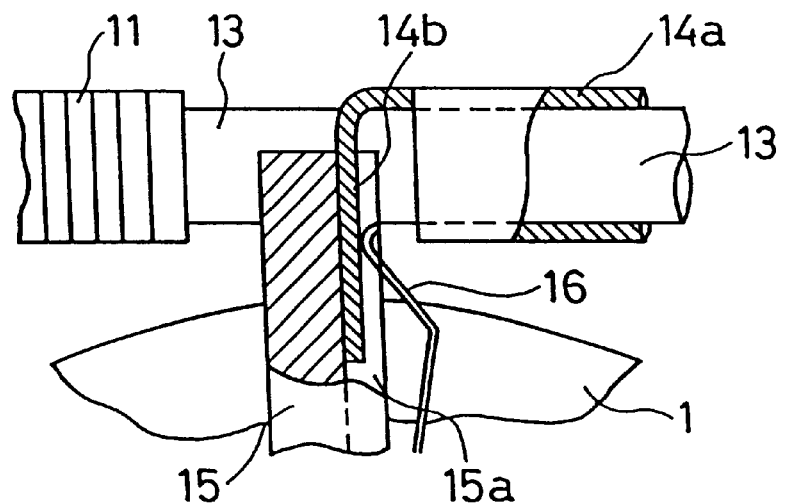
FIG. 6 is a partially cut sectional view enlarging essential portions of an X-axis actuator.

An explanation will be given of embodiments of the present invention as follows. FIG. 1 is a perspective view showing the structure of an apparatus for correcting a shift in holding a camera to which the present invention is applied, FIG. 2 is a front view thereof, FIG. 3 is a front view showing a barrel of a correcting lens L, FIG. 4(a) is a sectional view taken along a line I—I of FIG. 2, FIG. 4(b) is a sectional view taken along line III—III of FIG. 2, FIG. 5(a) is a sectional view taken along a line II—II of FIG. 2, FIG. 5(b) is a sectional view taken along line IV—IV of FIG. 2, and FIG. 6 is a partially cut sectional view enlarging essential portions of an X-axis actuator 10 in FIG. 2. In FIG. 1 through FIG. 6, numeral 1 designates a base frame supporting a drive mechanism of a correcting lens and an opening 1a is installed at a central portion thereof. Numeral 2 designates a barrel of a correcting lens L which is disposed at the portion of the opening 1a at the central portion of the base frame 1 and is supported by an X-axis actuator 10 and a Y-axis actuator 20, mentioned later, movably in X-axis direction and Y-axis direction on a plane orthogonal to an optical axis (Z-axis). A support block 3 to which piezoelectric elements of the X-axis actuator 10 and the Y-axis actuator 20 are fixedly adhered, is installed on the base frame 1.

The base frame 1 is positioned inside the taking lens TL of a camera. In order to move the base frame 1 in the direction of the optical axis while regulating the rotational position thereof, a focus guide shaft 4 arranged in parallel with the optical axis is arranged in the barrel and a support block 3 is installed with a hole 3a to which the focus guide shaft 4 penetrates.

As is apparent in reference to FIG. 3, three pieces of radially extended arms 2a, 2b and 2c are formed at the barrel 2 of the correcting lens L in order to hold the position of the barrel 2 in respect of the base frame 1. As is apparent in reference to FIG. 4(a), projections 2p and 2q are installed on front surfaces and rear surfaces of the arms 2a, 2b and 2c, respectively. And when the arms 2a, 2b and 2c of the barrel 2 are pressed toward the base frame 1 by a pressing plate 5 in a circular disk shape, the projections 2p and 2q are respectively brought into contact with the base frame 1 and the pressing plate 5 by which the position of the barrel 2 in respect of the base frame 1 can be maintained. Slight inclination of the barrel 2 in respect of the base frame 1 or the like can be corrected by adjusting heights of the projections 2p.

Next, an explanation will be given of the X-axis actuator 10 and the Y-axis actuator 20. First, an explanation will be given of the X-axis actuator 10. One end of a piezoelectric element 11 of the X-axis actuator 10 is fixedly adhered to the support block 3 on the base frame 1, a drive shaft 13 is fixedly adhered to other end of the piezoelectric element 11 and one end of the drive shaft 13 is supported by a block 12 movably in a direction in parallel with X-axis. A frictional coupling portion 14a of a moving member 14 is frictionally coupled with the drive shaft 13 movably in a direction in parallel with X-axis by pertinent frictional force. Further, an extended portion 14b extended from the moving member 14 is engaged with a groove 15a of an operating member 15 extended in a direction in parallel with Y-axis and is brought into press contact with the operating member 15 by an urging spring 16. Press contact force exerted on the extended portion 14b by the urging spring 16 is set to be sufficiently larger than force for moving the moving member 14 in X-axis direction.

The extended portion 14b can be moved in Y-axis direction by being engaged with the groove 15a of the operating member 15 and accordingly, when the barrel 2 of the correcting lens L is moved in Y-axis direction, the extended portion 14b moves in Y-axis direction on the groove of the operating member 15 and does not hamper movement of the barrel 2 in Y-axis direction.

By referring to FIG. 4(a) and FIG. 5(a), the structure of a portion where the extended portion 14b of the moving member 14 is engaged with the groove 15a of the operating member 15 in the X-axis actuator 10 mentioned above is well understood. Further, by referring to FIG. 6 in which essential essential portions of the X-axis actuator 10 in FIG. 2 are enlarged and a section a portion of which is cut is shown, a state where the extended portion 14b extended from the moving member 14 is engaged with the groove 15a of the operating member 15 formed at the barrel 2 of the correcting lens L and the extended portion 14b is brought into press contact with the operating member 15 by the urging spring 16, is well understood.

Next, an explanation will be given of the Y-axis actuator 20. One end of a piezoelectric element 21 of the Y-axis actuator 20 is fixedly adhered to the support block 3 on the base frame 1, a drive shaft 23 is fixedly adhered to other end of the piezoelectric element 21 and one end of the drive shaft 23 is supported by a block 22 movably in a direction in parallel with Y-axis.

The structure of the Y-axis actuator 20 explained below is a structure similar to that of the X-axis actuator 10 and understanding of the structure is desired by changing numeral number of the respective members in the drawings for explaining the X-axis actuator to read twenties although there are portions illustration of which are omitted.

A frictional coupling portion 24a of a moving member 24 is frictionally coupled to the drive shaft 23 movably in a direction in parallel with Y-axis by a pertinent frictional force. Further, an extended portion 24b extended from a moving member 24 is engaged with a groove 25a extended in the direction in parallel with X-axis of an operating member 25 formed at the barrel 2 of the correcting lens L and is brought into press contact with the operating member 25 by an urging spring 26. Press contact force exerted on the extended portion 24b by the urging spring 26 is set to be sufficiently larger than force for moving the moving member 24 in Y-axis direction.

The extended portion 24b can be moved in X-axis direction by being engaged with the groove of the operating member 25 and therefore, when the barrel 2 of the correcting lens L is moved in X-axis direction, the extended portion 24b is moved in X-axis direction on the groove 25a of the operating member 25 and does not hamper movement of the barrel 2 in X-axis direction.

Next, an explanation will be given of the operation in reference to FIG. 2. The X-axis actuator 10 and the Y-axis actuator 20 are provided with substantially the same structure and therefore, an explanation will be given here of the operation of the X-axis actuator 10 and an explanation of the operation of the Y-axis actuator 20 will be omitted.

Figure 15A:
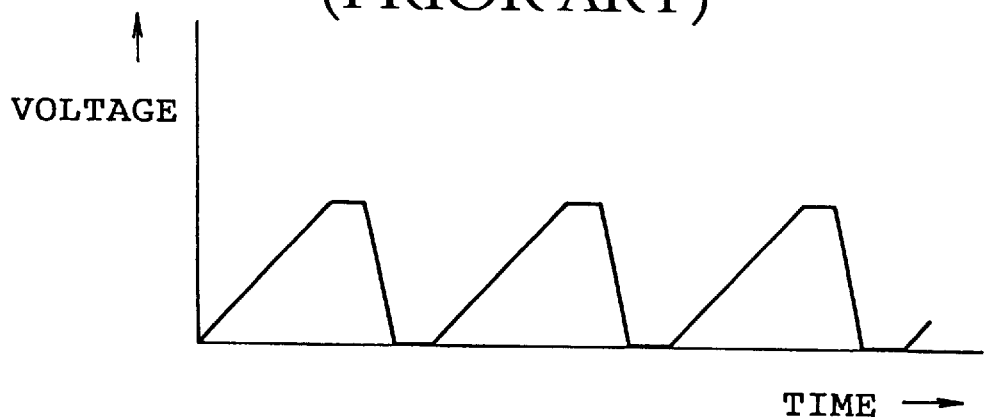
FIGS. 15(a) and 15(b) are diagrams for explaining waveforms of drive pulses.

When a drive pulse having a waveform comprising a gradual rise portion and a steep fall portion succeeding thereto as shown by FIG. 15(a), is applied to the piezoelectric element 11, at the gradual rise portion of the drive pulse, the piezoelectric element 11 is displaced to elongate gradually in the thickness direction and the drive shaft 13 is displaced in a direction shown by an arrow mark "a". Therefore, the moving member 14 frictionally coupled to the drive shaft 13 at the frictional coupling portion 14a and the extended portion 14b are also moved in the arrow mark "a" direction. The extended portion 14b and the operating member 15 are brought into press contact with each other by the urging spring 16 and the press contact force is set to be large enough compared with the force for moving the moving member 14 in the axial direction and accordingly, the extended portion 14b and the operating member 15 are integrally moved in the arrow mark "a" direction and therefore, the barrel 2 of the correcting lens L coupled to the operating member 15 is moved in the arrow mark "a" direction (here, positive direction of X-axis).

At the steep fall portion of the drive pulse, the piezoelectric element 11 is displaced to contract rapidly in the thickness direction and the drive shaft 13 is also displaced in a direction opposed to the arrow mark "a". At this moment, the moving member 14 frictionally coupled to the drive shaft 13 at the frictional coupling portion 14a and the extended portion 14b remain substantially at the positions by overcoming the frictional coupling force between the drive shaft 13 and the frictional coupling portion 14a by its inertia force and accordingly, the barrel 2 of the correcting lens L stays unmoved.

Incidentally, "substantially" mentioned here signifies that the moving member 14 follows the drive shaft 13 while causing a slip therebetween in either of the arrow mark "a" direction and the direction opposed thereto and is moved in the arrow mark "a" direction as a whole by a difference in drive time periods. Which moving mode is constituted, is determined in accordance with a given frictional condition.

The correcting lens L can continuously be moved in the positive direction of X-axis by continuously applying the drive pulse having the above-described waveform to the piezoelectric element 11.

Figure 15B:
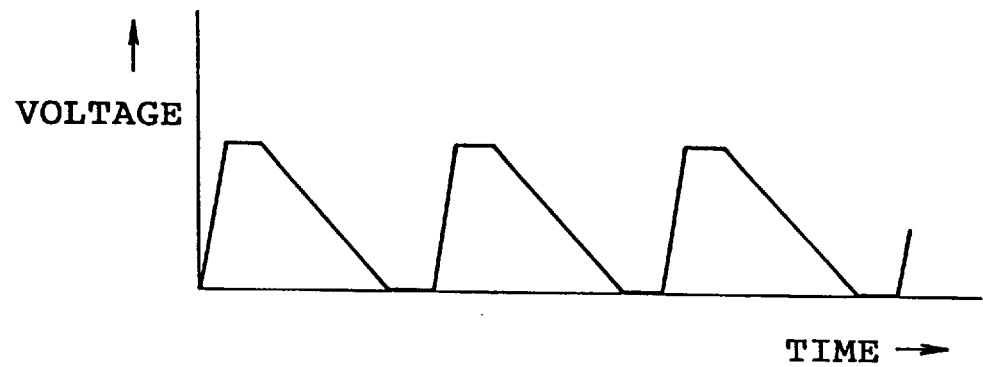

In moving the correcting lens L in the negative direction of X-axis, the movement can be achieved by applying a drive pulse having a waveform comprising a steep rise portion and a gradual fall portion succeeding thereto as shown by FIG. 15(b) to the piezoelectric element 11.

The Y-axis actuator 20 is also operated similar to the X-axis actuator 10 and the correcting lens L can be moved continuously in Y-axis direction.

Figure 7:
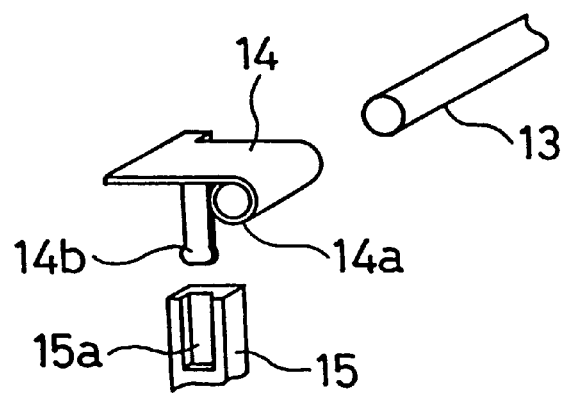
FIG. 7 is a perspective view for explaining the structure of a frictional coupling portion of a moving member.

According to the above-described structure, as shown by FIG. 7, the moving member 14 (the same as the moving member 24) is formed with the frictional coupling portion 14a and the extended portion 14b from one sheet of a plate made of an elastic material such as metal. Particularly, the frictional coupling portion 14a is constituted by forming in a substantially cylindrical type section which is partially opened (C shape) and which is provided with a diameter smaller than the diameter of the drive shaft 13 and is frictionally coupled to the drive shaft 13 by its own elastic force. Otherwise, the frictional coupling portion may be frictionally coupled thereto by its own elastic force with a sectional shape thereof in a triangular section, a quadrangular section or the like.

Although detection of the position of the correcting lens L which is made to move in X-axis direction and Y-axis direction for correcting holding shift, is not the major topic of the present invention and therefore, a detailed explanation thereof will be omitted, for example, the positions of X-axis direction and Y-axis direction of the correcting lens L can be detected by attaching LED (Light Emitting Diode) to the barrel 2 of the correcting lens L and detecting light projected from LED by a two-dimensional PSD (photo-sensitive didode) attached to the base frame 1.

Next, an explanation will be given of a relationship between a waveform of a drive pulse applied to a piezoelectric element and a driving speed. It has previously been stated in explaining the problem to be solved that based on a characteristics of a piezoelectric element, elongation displacement and contraction displacement in respect of the same applied voltage differ from each other.

FIGS. 8(a), 8(b), 8(c) and 8(d) and FIGS. 9(a), 9(b), 9(c) and 9(d) are diagrams showing a relationship between a waveform of a drive pulse and a driving speed (average value) when a driven member is driven by utilizing elongation displacement/contraction displacement of a piezoelectric element. As has been explained previously, the driven member is intermittently driven by elongation displacement/contraction displacement of the piezoelectric element and therefore, the driving speed is varied in accordance with the elongation displacement/contraction displacement, however, the driving speed mentioned here signifies an average driving speed calculated from a movement distance per unit time.

Figure 8A:
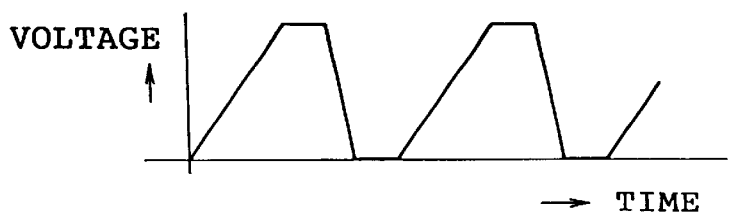
FIGS. 8(a), 8(b), 8(c) and 8(d) are diagrams showing a relationship between a waveform of a drive pulse and a driving speed when a driven member is driven by utilizing elongation displacement and contraction displacement of a piezoelectric element.
Figure 8B:
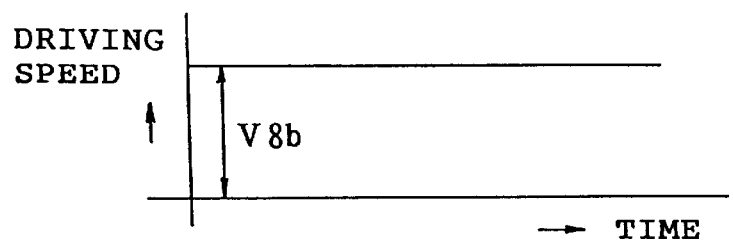

FIGS. 8(a), 8(b), 8(c) and 8(d) explain driving speeds in the case of drive pulses having waveforms suitable for driving the driven member by utilizing the elongation displacement of the piezoelectric element. When a waveform of the drive pulse applied to the piezoelectric element is a sawtooth waveform having a gradual rise portion and a steep fall portion as shown in FIG. 8(a), a comparatively high driving speed V8b can be obtained as shown in FIG. 8(b).

Figure 8C:
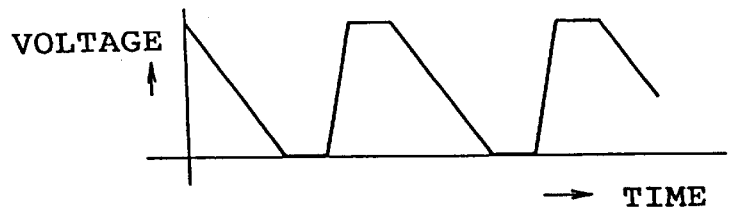
Figure 8D:
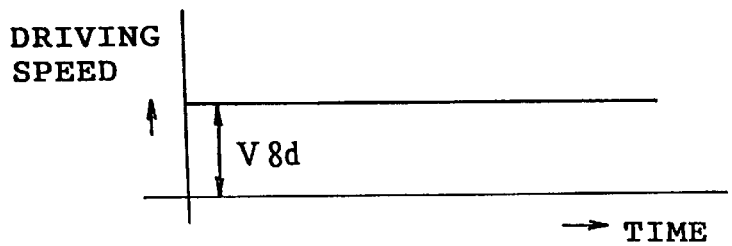

On the contrary, when a waveform of drive pulse applied to the piezoelectric element is a sawtooth waveform having a gradual fall portion and a steep rise portion as shown in FIG. 8(c), a comparatively low driving speed V8d (V8d<V8b) can be obtained as shown in FIG. 8(d).

In latter case, although the drive direction is reverted, the waveform may be specified as the same as the previous waveform in view of a point where inclinations of the rise portion and the fall portion of FIG. 8(a) are the same as inclinations of the fall portion and the rise portion of FIG. 8(c). Hereinafter, the latter waveform is referred to as reverted waveform.

As is apparent from the drawings, it is known that the driving speed in the case of the drive pulse having the waveform suitable for driving the driven member by utilizing the elongation displacement of the piezoelectric element, is faster than the driving speed in the case of driving the driven member by causing the contraction displacement in the piezoelectric element by the drive pulse of the reverted waveform.

Figure 9A:
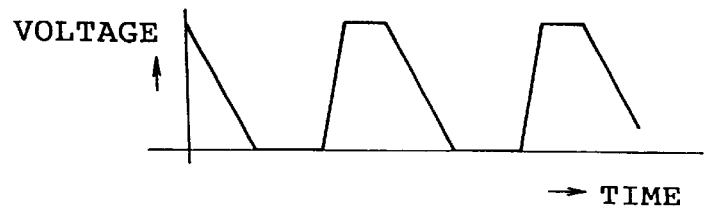
FIGS. 9(a), 9(b), 9(c) and 9(d) are diagrams showing a relationship between a waveform of a drive pulse and a driving speed when a driven member is driven by utilizing elongation displacement and contraction displacement of a piezoelectric element.
Figure 9B:
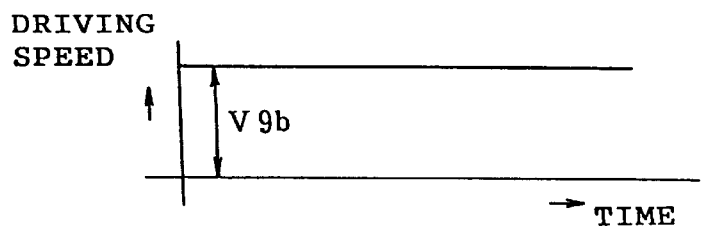

FIGS. 9(a), 9(b), 9(c) and 9(d) explain driving speeds in the case of drive pulses having waveforms suitable for driving the driven member by utilizing the contraction displacement of the piezoelectric element. When a waveform of a drive pulse applied to the piezoelectric element is a waveform having a steep rise portion and a gradual fall portion as shown in FIG. 9(a), a comparatively high driving speed V9b can be obtained as shown in FIG. 9(b).

Figure 9C:
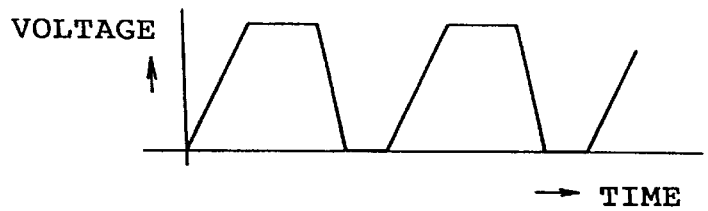
Figure 9D:
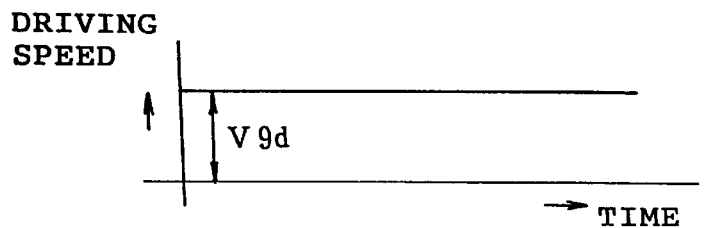

On the contrary, when a waveform of the drive pulse applied to the piezoelectric element is reverted to a steep fall portion and a gradual rise portion, a comparatively low driving speed V9d(V9d<V9b) can be obtained as shown in FIG. 9(d).

As is apparent from the drawings, it is understood that the driving speed in the case of driving the driven member by the contraction displacement of the piezoelectric element, is faster than the driving speed in the case of driving the driven member by the drive pulses having the reverted waveforms where the previous waveform is reverted.

Hence, in the holding shift correcting apparatus shown by FIG. 1 and FIG. 2, when the upward direction is specified as "top" that is, the direction of the gravitational force is disposed to direct in the lower direction in FIG. 2, the barrel 2 of the correcting lens L is moved vertically in the upward direction (upward direction of FIG. 2) against the gravitational force, in view of the arrangement of the Y-axis actuator 20. Thus, the barrel 2 is driven by utilizing the contraction displacement of the piezoelectric element 21 and therefore, the drive pulse having the waveform suitable for driving the driven member by utilizing the contraction displacement is used.

That is, the drive pulse for applying to the piezoelectric element of the Y-axis actuator 20 is constituted by the drive pulse of the waveform having the steep rise portion and the gradual fall portion as shown by FIG. 9(a). In this case, when the barrel 2 of the correcting lens L is moved vertically in the downward direction (downward direction of FIG. 2) in compliance with the gravitational force, the drive pulse having the waveform as shown by FIG. 9(c) where the waveform shown by FIG. 9(a) is reverted, is constituted.

Thereby, the barrel 2 of the correcting lens L can be moved at high speed vertically in the upward direction against the gravitational force. Further, when the barrel 2 of the correcting lens L is moved vertically in the downward direction in compliance with the gravitational force, the drive speed is not considerably lowered since the load is small and the barrel 2 can be driven advantageously. In respect of the drive pulses, the drive pulses having the waveform shown by FIG. 9(a) and the reverted waveform (reverted waveform explained above) shown by FIG. 9(c) are used and therefore, the basic waveform stays the same and the constitution of a pulse generating circuit can be simplified.

Figure 10:
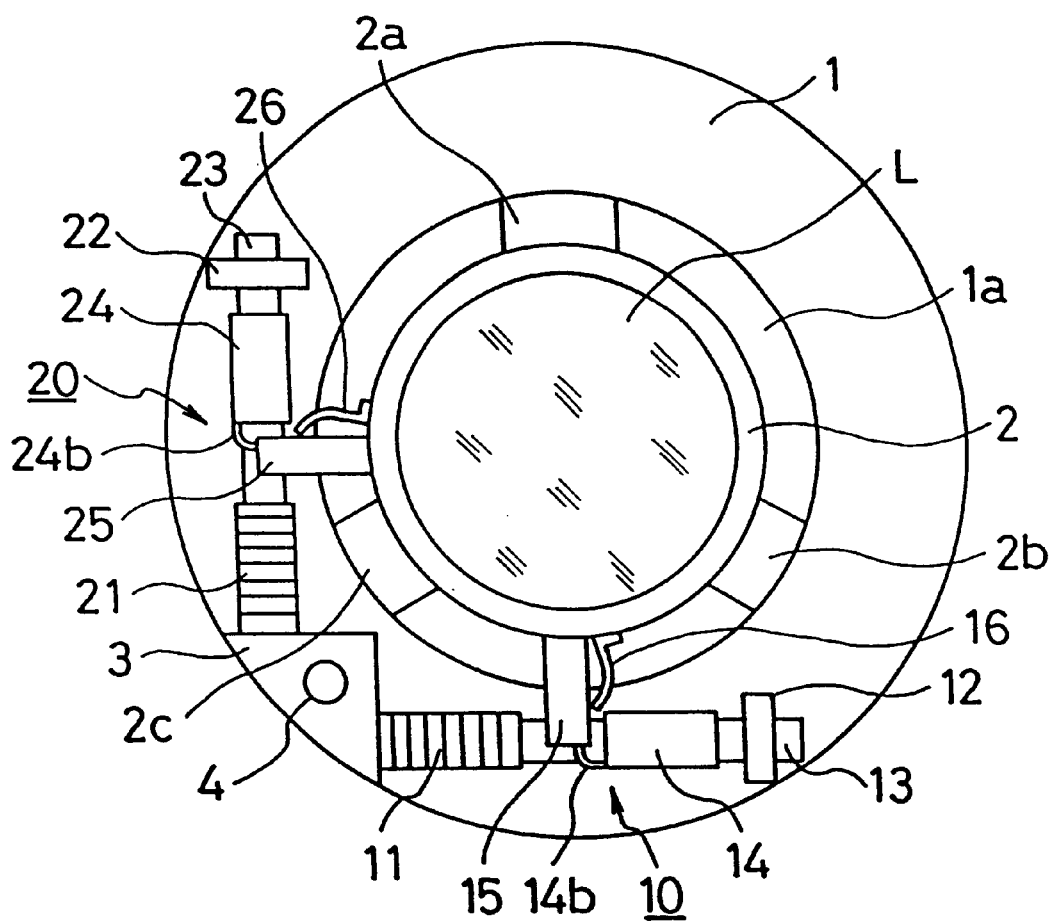
FIG. 10 is a front view showing a modified example of arranging a Y-axis actuator of an apparatus for correcting a shift in holding a camera.
Figure 11:
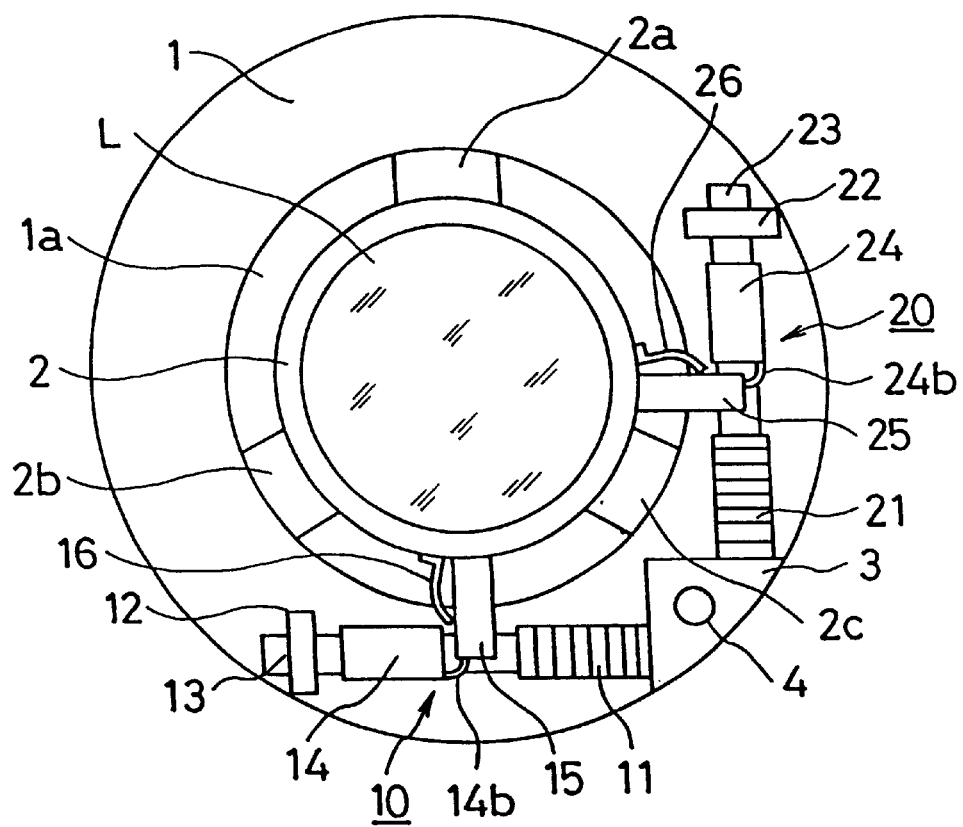
FIG. 11 is a front view showing other modified example of arranging a Y-axis actuator of an apparatus for correcting a shift in holding a camera.
Figure 12:
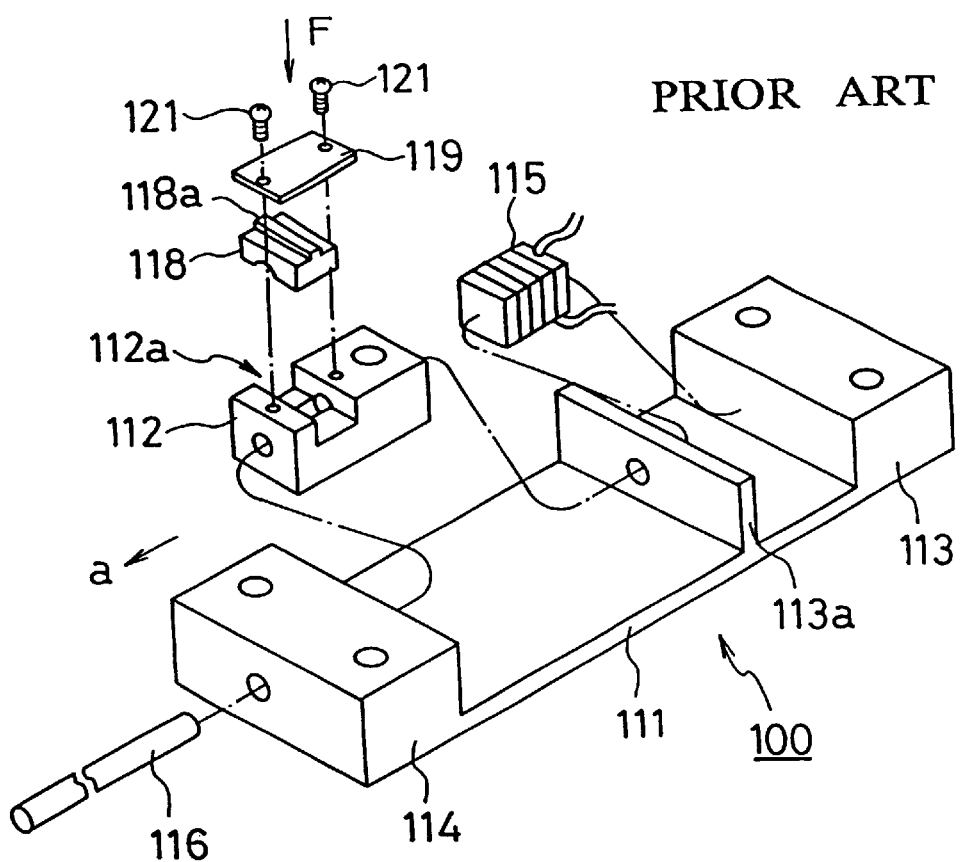
FIG. 12 is a perspective view showing a conventional actuator by disassembling the actuator into constituent members.
Figure 13:
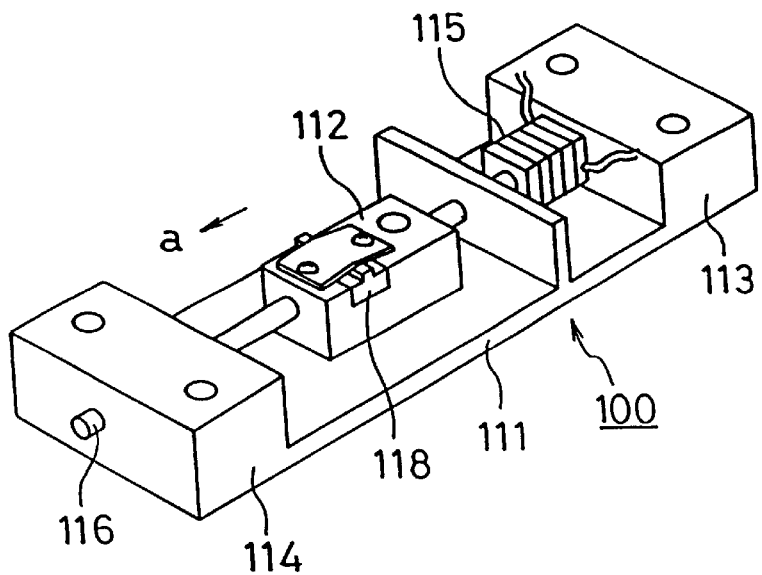
FIG. 13 is a perspective view showing a state where the conventional actuator is integrated.
Figure 14:
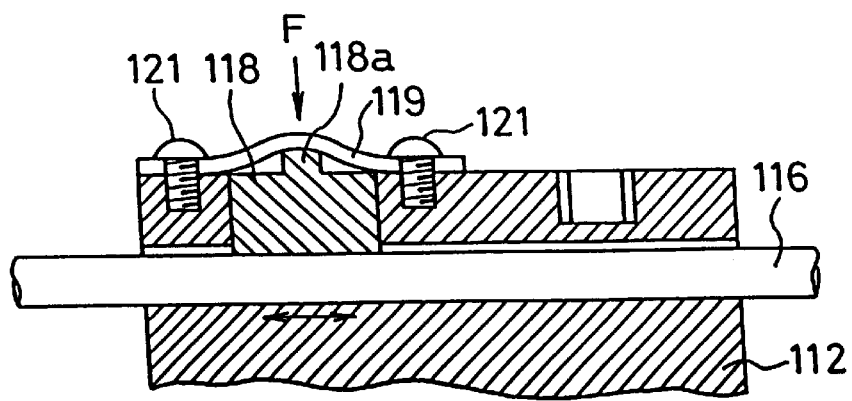
FIG. 14 is a sectional view showing the structure of a portion where an actuator drive shaft, a slider block and a pad in the conventional technology are assembled.

FIG. 10 and FIG. 11 are other examples showing the arrangement of X-axis actuator and Y-axis actuator. In FIG.

10 or FIG. 11, the upward direction is specified as "top", that is, the direction of the gravitational force is disposed to direct in the downward direction in FIG. 10 or FIG. 11, in moving the barrel 2 of the correcting lens L vertically in the upward direction (upward direction in FIG. 10 or FIG. 11), the barrel 2 is moved against the gravitational force, in view of arrangement of the Y-axis actuator 20. The barrel 2 is driven by utilizing the elongation displacement of the piezoelectric element 21 and accordingly, the drive pulse having the waveform suitable for driving the driven member by utilizing the elongation displacement is used.

That is, the drive pulse applied to the piezoelectric element of the Y-axis actuator 20 is constituted by the drive pulse of the waveform having the gradual rise portion and the steep fall portion as shown by FIG. 8(a). In this case, when the barrel 2 of the correcting lens L is moved vertically in the downward direction in compliance with the gravitational force, the drive pulse having the waveform as shown by FIG. 8(c) where the waveform shown by FIG. 8(a) is reverted, is used.

Thereby, the barrel 2 of the correcting lens L can be driven at high speed vertically in the upward direction against the gravitational force. Further, when the barrel 2 of the correcting lens L is moved vertically in the downward direction in compliance with the gravitational force, the driving speed is not considerably lowered since the load is small and the barrel 2 can be driven advantageously. Also in this case, in respect of the drive pulses, the drive pulses having the waveform shown by FIG. 8(a) and the reverted waveform (reverted waveform explained above) shown by FIG. 8(c) are used and accordingly, the basic waveform stays the same and the structure of a pulse generating circuit can be simplified.

Although according to the above-described explanation, an explanation has been given in respect of the relationship between the waveform of the drive pulse and the driving speed when the driven member is driven by utilizing the elongation displacement and the contraction displacement of the piezoelectric element, even when the driving speed is replaced by drive force, the content explained in reference to FIGS. 8(a), 8(b), 8(c) and 8(d) and FIGS. 9(a), 9(b), 9(c) and 9(d) is established.

Further, as explained above, the same waveform (as explained above, also the reverted waveform can be regarded as the same waveform) is used in driving load such as the barrel 2 of the correcting lens L in the direction against the gravitational force and in the direction in compliance with the gravitational force in contrast thereto and accordingly, the basic waveform stays the same and the structure of a pulse generating circuit can be simplified.

However, in the case where the driving speed or the drive force is considered with priority, when the driven member is driven by utilizing the elongation displacement of the piezoelectric element, the drive pulse having the waveform suitable for driving the driven member by the elongation displacement, or the drive pulse of FIG. 8(a) in the above-described example may be used and when the driven member is driven by utilizing the contraction displacement of the piezoelectric element, the drive pulse having the waveform suitable for driving the driven member by the contraction displacement, or the drive pulse of FIG. 9(a) shown by the above-described example may be used.

As has been explained, according to the present embodiment, a drive apparatus, having an electromechanical transducer, is used to drive a driven member, frictionally coupled to a driving member, in a predetermined direction by causing reciprocating movement such that different speeds are achieved by the driving member. The speeds of the driving member are effected by elongation and contraction displacement of the electromechanical transducer. Drive pulses applied to the electromechanical transducer produce both elongation displacement and contraction displacement of the electromechanical transducer. With respect to a structure where the magnitude of the load differs in the positive and the negative driving directions of the driven member, the electromechanical transducer is positioned such that the elongation displacement direction and the contraction displacement direction of the electromechanical transducer, are made to coincide substantially with the drive direction of larger load.

Thereby, when an apparatus having a structure where the magnitude of load differs in positive and negative directions of driving a driven member, for example, a drive apparatus using an electromechanical transducer is applied in a lens for correcting a shift in holding a camera, the load is increased in the case of moving the correcting lens against the gravitational force, however, according to the present embodiment, the electromechanical transducer is arranged such that the direction of a further advantageous displacement structure is made to coincide substantially with the drive direction where the load is larger and a generating circuit for generating drive pulses of waveforms suitable therefor or a control circuit is used by which the driven member can be driven efficiently at a proper speed in any of the directions without complicating the constitution of the drive pulse generating circuit or the control circuit.

This application is based on patent application No. 9-213943 filed in Japan, the contents of which are hereby incorporated by reference.

As many apparently different embodiments of this invention may be made without departing from the spirit and scope thereof, it is to be understood that the invention is not limited to the specific embodiments thereof except as defined in the appended claims.

What is claimed is:

1. An actuator for use in a structure where a load magnitude varies over a range of movement of the actuator, said actuator comprising:
   an electromechanical transducer having a greater displacement characteristic for one of an elongation displacement and a contraction displacement;
   a driving member fixedly coupled to the electromechanical transducer; and
   a driven member frictionally coupled to the driving member;
   wherein the electromechanical transducer is adapted to receive drive pulses that effect an elongation displacement or effect a contraction displacement,
   wherein the driving member is reciprocatively driven in accordance with an elongation displacement or a contraction displacement of the electromechanical transducer in response to received drive pulses so as to drive the driven member in a predetermined direction, and
   wherein the electromechanical transducer is arranged such that the greater displacement characteristic of the electromechanical transducer is principally utilized in driving the driven member in a direction subject to a greatest load magnitude.

2. An actuator according to claim 1, wherein the direction subject to a greatest load magnitude corresponds to a direction opposing a gravitational force direction.

3. An actuator according to claim 1, wherein each drive pulse has a predetermined rise portion and a predetermined fall portion.

4. An actuator according to claim 1, wherein a waveform of a received drive pulse dictates whether the electromechanical transducer effects an elongation displacement or a contraction displacement.

5. An actuator using an electromechanical transducer according to claim 1, wherein the greater displacement characteristic enables a greater driven member driving speed for a given drive pulse voltage for the one of an elongation displacement and a contraction displacement.

6. An actuator using an electromechanical transducer according to claim 1, wherein the greater displacement characteristic enables a greater driven member driving force for a given drive pulse voltage for the one of an elongation displacement and a contraction displacement.

7. An apparatus having an actuator, said apparatus comprising:
   an electromechanical transducer having a greater displacement characteristic for one of an elongation displacement and a contraction displacement;
   a driving member fixedly coupled to the electromechanical transducer;
   a driven member frictionally coupled to the driving member;
   an element coupled to the driven member;
   wherein the electromechanical transducer is adapted to receive drive pulses that effect an elongation displacement or effect a contraction displacement,
   wherein the driving member is reciprocatively driven in accordance with an elongation displacement or a contraction displacement of the electromechanical transducer in response to received drive pulses so as to drive the driven member in a predetermined direction, and
   wherein when the element coupled to the driven member is subject to a load magnitude that differs depending on a direction of movement of the element, the greater displacement characteristic of the electromechanical transducer substantially coincides with a direction of element movement subject to a greater load magnitude.

8. An apparatus according to claim 7, wherein the direction where the load magnitude is greater corresponds to a direction opposing a gravitational force direction.

9. An apparatus according to claim 7, wherein each drive pulse has a predetermined rise portion and a predetermined fall portion.

10. An apparatus according to claim 7, wherein a waveform of a received drive pulse dictates whether the electromechanical transducer effects an elongation displacement or a contraction displacement.

11. An apparatus according to claim 7, wherein the greater displacement characteristic enables a greater driven member driving speed for a given drive pulse voltage for the one of an elongation displacement and a contraction displacement.

12. An apparatus according to claim 7, wherein the greater displacement characteristic enables a greater driven member driving force for a given drive pulse voltage for the one of an elongation displacement and a contraction displacement.

13. An actuator for use in a structure where a load magnitude varies over a range of movement of the actuator, said actuator comprising:
   an electromechanical transducer;
   a driving member fixedly coupled to the electromechanical transducer; and
   a driven member frictionally coupled to the driving member;
   wherein the electromechanical transducer is adapted to receive drive pulses that effect an elongation displacement or effect a contraction displacement,
   wherein the driving member is reciprocatively driven in accordance with an elongation displacement and a contraction displacement of the electromechanical transducer in response to received drive pulses so as to drive the driven member in a predetermined direction, and
   wherein the electromechanical transducer has a greater displacement characteristic for one of an elongation displacement and a contraction displacement, and the electromechanical transducer is arranged such that the greater displacement characteristic of the electromechanical transducer is principally utilized in driving the driven member in a direction subject to a greatest load magnitude.

14. An actuator according to claim 13, wherein the direction where the load magnitude is greater corresponds to a direction opposing a gravitational force direction.

15. An actuator according to claim 13, wherein a waveform of a received drive pulse dictates whether the electromechanical transducer effects an elongation displacement or a contraction displacement.

16. An actuator according to claim 13, wherein the greater displacement characteristic enables a greater driven member driving speed for a given drive pulse voltage for the one of an elongation displacement and a contraction displacement.

17. An actuator according to claim 13, wherein the greater displacement characteristic enables a greater driven member driving force for a given drive pulse voltage for the one of an elongation displacement and a contraction displacement.

18. An apparatus having an actuator, said apparatus comprising:
   an electromechanical transducer;
   a driving member fixedly coupled to the electromechanical transducer;
   a driven member frictionally coupled to the driving member;
   an element coupled to the driven member;
   wherein the electromechanical transducer is adapted to receive drive pulses that effect an elongation displacement or effect a contraction displacement,
   wherein the driving member is reciprocatively driven in accordance with an elongation displacement and a contraction displacement of the electromechanical transducer in response to received drive pulses so as to drive the driven member in a predetermined direction, and
   wherein the electromechanical transducer has a greater displacement characteristic for one of an elongation displacement and a contraction displacement, and when the element coupled to the driven member is subject to a load magnitude that differs depending on a direction of movement of the element, the greater displacement characteristic of the electromechanical transducer substantially coincides with a direction of element movement subject to a greater load magnitude.

19. An apparatus according to claim 18, wherein the direction where the load magnitude is greater corresponds to a direction opposing a gravitational force direction.

20. An apparatus according to claim 18, wherein a waveform of a received drive pulse dictates whether the electromechanical transducer effects an elongation displacement or a contraction displacement.

21. An apparatus according to claim 18, wherein the greater displacement characteristic enables a greater driven member driving speed for a given drive pulse voltage for the one of an elongation displacement and a contraction displacement.

22. An apparatus according to claim 18, wherein the greater displacement characteristic enables a greater driven member driving force for a given drive pulse voltage for the one of an elongation displacement and a contraction displacement.

* * * * *

UNITED STATES PATENT AND TRADEMARK OFFICE
CERTIFICATE OF CORRECTION

PATENT NO. : 6,232,700 B1
DATED : May 15, 2001
INVENTOR(S) : Akira Kosaka et al.

Page 1 of 1

It is certified that error appears in the above-identified patent and that said Letters Patent is hereby corrected as shown below:

Column 11,
Lines 1 and 2 (claim 5, lines 1 and 2), delete "An actuator using an electromechanical transducer according to Claim 1," and insert -- An actuator according to claim 1, --.

Lines 6 and 7 (claim 6, lines 1 and 2), delete "An actuator using an electromechanical transducer according to Claim 1," and insert -- An actuator according to claim 1, --.

Line 18 (claim 7, line 9), after "member;" insert -- and --.

Signed and Sealed this

Thirtieth Day of October, 2001

Attest:

NICHOLAS P. GODICI
*Attesting Officer* — *Acting Director of the United States Patent and Trademark Office*